US00RE48988E

(19) United States
(12) Reissued Patent
Turkbas

(10) Patent Number: US RE48,988 E
(45) Date of Reissued Patent: Mar. 29, 2022

(54) MOUTHGUARD

(71) Applicant: Shock Doctor, Inc., Fountain Valley, CA (US)

(72) Inventor: Jay N. Turkbas, Hideout, UT (US)

(73) Assignee: Shock Doctor, Inc., Fountain Valley, CA (US)

(21) Appl. No.: 29/765,026

(22) Filed: Jan. 5, 2021

Related U.S. Patent Documents

Reissue of:
(64) Patent No.: Des. 867,673
Issued: Nov. 19, 2019
Appl. No.: 29/693,788
Filed: Jun. 5, 2019

U.S. Applications:
(62) Division of application No. 29/629,798, filed on Dec. 15, 2017, now Pat. No. Des. 854,753.

(51) LOC (13) Cl. ..... 29-02
(52) U.S. Cl.
USPC ..... D29/108
(58) Field of Classification Search
USPC ..... D29/108; D24/110.5, 181, 176, 180, 194
CPC . A61F 5/566; A61F 5/58; A63B 71/08; A63B 71/081; A63B 71/085; A63B 2071/085; A63B 2071/088; A61C 7/10; A61C 13/08; A61C 13/081; A61C 13/083; A61C 13/087; A61C 19/066; A61C 5/14; A61B 13/00; A61B 13/24
See application file for complete search history.

(56) References Cited

U.S. PATENT DOCUMENTS

| | | | |
|---|---|---|---|
| 1,146,264 | A | 7/1915 | Kelly |
| 1,505,642 | A | 8/1924 | Frank |
| 1,569,947 | A | 1/1926 | Buttress |
| 1,720,439 | A | 7/1929 | Richardson |
| 2,312,171 | A | 2/1943 | Jochum |
| 2,444,294 | A | 6/1948 | Jones et al. |

(Continued)

FOREIGN PATENT DOCUMENTS

| | | | |
|---|---|---|---|
| AU | 2013205854 | A1 | 3/2014 |
| GB | 2491183 | A | 11/2012 |
| WO | 2014/093850 | A1 | 6/2014 |
| WO | 2014093850 | A1 | 6/2014 |

OTHER PUBLICATIONS

International Preliminary Report on Patentability issued in PCT/US2014/018756, dated Sep. 1, 2015, 7 pages.

(Continued)

*Primary Examiner* — Philip S Hyder
(74) *Attorney, Agent, or Firm* — Faegre Drinker Biddle & Reath LLP

(57) CLAIM

The ornamental design for a mouthguard, as shown and described.

DESCRIPTION

FIG. 1 is a front, left side perspective view of a mouthguard showing my new design;
FIG. 2 is a front view thereof;
FIG. 3 is a back view thereof;
FIG. 4 is a left side view thereof;
FIG. 5 is a right side view thereof;
FIG. 6 is a top view thereof;
FIG. 7 is a bottom view thereof; and,
FIG. 8 is a rear perspective view thereof
*The broken lines depict portions of the mouthguard in which the design is embodied that are not considered part of the claimed design.*

1 Claim, 8 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS 2,521,039 A * 9/1950 Carpenter ..... A63B 71/085 128/861
2,827,899 A 3/1958 Altieri
2,966,908 A 1/1961 Cathcart et al.
3,089,487 A 5/1963 Enicks et al.
3,103,217 A 9/1963 Butler et al.
3,207,153 A 9/1965 Goldstein
3,223,085 A 12/1965 Gores et al.
3,228,107 A 1/1966 Zandberg
3,234,942 A 2/1966 Simor
3,236,235 A 2/1966 Jacobs
3,247,844 A * 4/1966 Berghash ..... A63B 71/085 128/862
3,312,218 A 4/1967 Jacobs
3,333,582 A 8/1967 Cathcart
3,411,501 A 11/1968 Greenberg
D212,848 S 12/1968 Westlund et al.
3,457,916 A * 7/1969 Wolicki ..... A63B 71/085 128/862
3,496,936 A 2/1970 Gores
3,505,995 A 4/1970 Greenberg
3,692,025 A 9/1972 Greenberg
3,768,465 A 10/1973 Helmer
3,788,314 A 1/1974 Noreen
3,878,610 A 4/1975 Coscina
RE28,667 E 12/1975 Gores
4,134,400 A 1/1979 DiMatteo
D263,073 S 2/1982 Jonkers et al.
D268,962 S 5/1983 Adams et al.
D273,527 S 4/1984 Pota
4,471,772 A 9/1984 Miller, Jr.
4,495,945 A 1/1985 Liegner
4,568,280 A 2/1986 Ahlin
4,610,743 A 9/1986 Salmeen et al.
4,944,947 A 7/1990 Newman
4,977,905 A 12/1990 Kittelsen et al.
5,031,638 A 7/1991 Castaldi
5,063,940 A 11/1991 Adell et al.
5,078,367 A 1/1992 Simpson et al.
5,117,816 A 6/1992 Shapiro et al.
D328,494 S 8/1992 Schwendeman et al.
D328,965 S 9/1992 Ewing
5,165,424 A 11/1992 Silverman
5,259,762 A 11/1993 Farrell
5,277,203 A 1/1994 Hays
5,293,880 A 3/1994 Levitt
5,336,086 A 8/1994 Simmen et al.
5,339,832 A 8/1994 Kittelsen et al.
5,406,963 A 4/1995 Adell
5,566,683 A 10/1996 Thornton
5,611,355 A 3/1997 Hilsen
5,642,737 A 7/1997 Parks
D382,965 S 8/1997 Wagner
5,692,523 A 12/1997 Croll et al.
5,693,523 A 12/1997 Watanabe et al.
5,794,274 A 8/1998 Kraemer
5,826,581 A 10/1998 Yoshida
5,842,860 A 12/1998 Funt
D406,647 S 3/1999 Wagner
D414,281 S 9/1999 Sassenberg
5,970,981 A 10/1999 Ochel
6,036,487 A 3/2000 Westerman
6,068,475 A 5/2000 Stoyka, Jr.
6,081,932 A 7/2000 Kraemer
6,082,363 A 7/2000 Washburn
6,280,196 B1 8/2001 Berghash
D452,011 S 12/2001 Redhage
6,405,729 B1 6/2002 Thornton
6,450,167 B1 9/2002 David et al.
6,491,036 B2 12/2002 Cook
6,494,210 B1 12/2002 Mams
6,584,978 B1 7/2003 Brett et al.
6,691,710 B2 2/2004 Kittelsen et al.
D492,785 S 7/2004 Garabito
D493,578 S 7/2004 Manzo et al.
D500,895 S * 1/2005 Manzo ..... D29/108
D509,028 S * 8/2005 Farrell ..... D29/108
6,978,786 B2 12/2005 Sabbagh
D523,994 S * 6/2006 Manzo ..... D29/108
D525,749 S 7/2006 Manzo et al.
D526,093 S 8/2006 Manzo et al.
D526,095 S * 8/2006 Manzo ..... D29/108
D527,848 S 9/2006 Manzo et al.
D530,863 S * 10/2006 Manzo ..... D29/108
D532,559 S * 11/2006 Manzo ..... D29/108
D537,986 S 3/2007 Manzo et al.
D537,987 S * 3/2007 Manzo ..... D29/108
D538,926 S 3/2007 Jeong et al.
D539,429 S 3/2007 Wong
D541,481 S 4/2007 Farrell
7,210,483 B1 5/2007 Lesniak et al.
7,216,371 B2 5/2007 Wong
D548,402 S 8/2007 Trodick
D548,403 S * 8/2007 Manzo ..... D29/108
7,299,804 B2 11/2007 Kittelsen et al.
D593,714 S 6/2009 Hirshberg
7,549,423 B1 6/2009 Hirshberg
D603,101 S 10/2009 Hirshberg
7,658,193 B2 2/2010 Lesniak
D611,658 S 3/2010 Manzo
D614,304 S 4/2010 Jansheski
D615,709 S * 5/2010 Manzo ..... D29/108
D616,152 S * 5/2010 Manzo ..... D29/108
D618,399 S * 6/2010 Manzo ..... D29/108
7,757,310 B2 7/2010 Wong
7,775,214 B1 8/2010 Lesniak et al.
D623,357 S * 9/2010 Manzo ..... D29/108
D626,292 S * 10/2010 Farrell ..... D29/108
D627,107 S * 11/2010 Manzo ..... D29/108
D630,382 S * 1/2011 Manzo ..... D29/108
D630,860 S 1/2011 Sichel
D634,480 S * 3/2011 Manzo ..... D29/108
D636,074 S 4/2011 Levine
7,954,496 B2 6/2011 Jansheski et al.
D641,478 S 7/2011 Belvedere et al.
D642,277 S * 7/2011 Farrell ..... D24/181
D644,791 S * 9/2011 Petrocelli ..... D29/108
8,033,392 B1 10/2011 Gehner et al.
D648,900 S * 11/2011 Manzo ..... D29/108
D649,252 S 11/2011 Spainhower
D652,575 S * 1/2012 Farrell ..... D29/108
D652,576 S * 1/2012 Farrell ..... D29/108
D654,595 S * 2/2012 Farrell ..... D24/181
8,116,854 B2 2/2012 Hart et al.
D658,813 S * 5/2012 Manzo ..... D29/108
D663,485 S 7/2012 Turkbas et al.
D663,486 S 7/2012 Turkbas et al.
8,235,052 B2 8/2012 Maurello
8,496,009 B2 * 7/2013 Manzo ..... A63B 71/085 128/859
D688,832 S 8/2013 Polk, III
D693,966 S 11/2013 Hanson
8,607,798 B2 12/2013 Turkbas et al.
8,739,599 B2 6/2014 Hennig et al.
D710,506 S 8/2014 Tolentino et al.
8,800,184 B1 8/2014 Lerman et al.
D714,066 S 9/2014 Thuma et al.
D727,571 S 4/2015 Brett et al.
D728,162 S 4/2015 Gottsch
D734,556 S * 7/2015 Brett ..... D24/181
D743,107 S * 11/2015 Hirshberg ..... D29/108
D743,108 S 11/2015 Charlton
D752,295 S * 3/2016 Lovat ..... D29/108
9,375,289 B1 6/2016 Walls
D760,889 S * 7/2016 Evans ..... D24/110.5
D765,919 S * 9/2016 Croll ..... D29/108
D782,743 S * 3/2017 Engel ..... D29/108
9,622,837 B2 4/2017 Jansheski
D795,439 S 8/2017 Mounce
D795,501 S 8/2017 Levine
9,731,103 B1 8/2017 Rouse et al.
D797,379 S * 9/2017 Patel ..... D29/108
D799,049 S * 10/2017 Farrell ..... D24/181
D800,317 S * 10/2017 Farrell ..... D24/181

(56) References Cited

U.S. PATENT DOCUMENTS

| | | | | |
|---|---|---|---|---|
| D804,043 | S | 11/2017 | Gildersleeve | |
| D804,829 | S | 12/2017 | Austin | |
| D807,583 | S | 1/2018 | Evans | |
| D814,053 | S | 3/2018 | Darrow et al. | |
| D815,291 | S | 4/2018 | Farrell | |
| D816,210 | S | 4/2018 | Gerschman et al. | |
| D830,640 | S | 10/2018 | Supple | |
| D833,621 | S * | 11/2018 | Tolentino | D24/181 |
| D833,681 | S * | 11/2018 | Tolentino | D29/108 |
| D839,485 | S * | 1/2019 | Turkbas | D29/108 |
| D841,257 | S * | 2/2019 | Turkbas | D29/108 |
| 10,213,677 | B1 | 2/2019 | Hirshberg | |
| D852,424 | S * | 6/2019 | Callabe | D29/108 |
| 10,314,679 | B2 | 6/2019 | Blank et al. | |
| D853,043 | S | 7/2019 | Turkbas | |
| D853,655 | S | 7/2019 | Turkbas | |
| D854,679 | S | 7/2019 | Gerschman et al. | |
| D854,753 | S | 7/2019 | Turkbas | |
| D857,301 | S | 8/2019 | Turkbas | |
| D867,673 | S | 11/2019 | Turkbas | |
| D869,774 | S | 12/2019 | Turkbas | |
| 10,661,062 | B2 | 5/2020 | Jay et al. | |
| 2003/0019497 | A1* | 1/2003 | Farrell | A61C 7/08 128/861 |
| 2003/0075184 | A1 | 4/2003 | Persichetti | |
| 2003/0136416 | A1 | 7/2003 | White | |
| 2003/0205234 | A1 | 11/2003 | Bardach et al. | |
| 2004/0076219 | A1 | 4/2004 | Madison et al. | |
| 2004/0110111 | A1 | 6/2004 | Wasylucha | |
| 2004/0146836 | A1* | 7/2004 | Andersen | A61C 19/066 433/215 |
| 2004/0146837 | A1 | 7/2004 | Andersen | |
| 2004/0154626 | A1 | 8/2004 | Washburn et al. | |
| 2005/0019524 | A1 | 1/2005 | Kershaw | |
| 2006/0021622 | A1 | 2/2006 | Buffington | |
| 2006/0084024 | A1* | 4/2006 | Farrell | A61C 7/08 433/6 |
| 2007/0084471 | A1 | 4/2007 | Napoli et al. | |
| 2007/0151567 | A1 | 7/2007 | Maurello | |
| 2007/0151568 | A1 | 7/2007 | Maurello | |
| 2007/0235039 | A1 | 10/2007 | Gottsch | |
| 2007/0254256 | A1* | 11/2007 | Farrell | A61C 7/08 433/6 |
| 2008/0113143 | A1 | 5/2008 | Taylor | |
| 2008/0138766 | A1* | 6/2008 | Jansheski | A61C 7/08 433/140 |
| 2009/0038624 | A1 | 2/2009 | Akervall et al. | |
| 2010/0051038 | A1* | 3/2010 | Quigless | A63B 71/085 128/861 |
| 2010/0055233 | A1 | 3/2010 | MacInnis et al. | |
| 2010/0196837 | A1* | 8/2010 | Farrell | A61C 7/08 433/6 |
| 2010/0304338 | A1 | 12/2010 | Cramer et al. | |
| 2011/0005531 | A1 | 1/2011 | Manzo | |
| 2011/0114100 | A1 | 5/2011 | Alvarez et al. | |
| 2011/0186055 | A1 | 8/2011 | Makkar et al. | |
| 2011/0214478 | A1 | 9/2011 | Hennig et al. | |
| 2011/0230587 | A1 | 9/2011 | MacInnis et al. | |
| 2012/0017922 | A1 | 1/2012 | Hirshberg | |
| 2012/0085354 | A1 | 4/2012 | Polk, III | |
| 2012/0090625 | A1 | 4/2012 | Evans et al. | |
| 2012/0111343 | A1 | 5/2012 | Turkbas et al. | |
| 2012/0174932 | A1 | 7/2012 | Wilson | |
| 2013/0052613 | A1 | 2/2013 | Chetiar et al. | |
| 2013/0068237 | A1 | 3/2013 | Herman et al. | |
| 2013/0074850 | A1 | 3/2013 | Lenart | |
| 2013/0087157 | A1 | 4/2013 | Hawkins | |
| 2013/0104913 | A1 | 5/2013 | Evans et al. | |
| 2014/0090655 | A1 | 4/2014 | Robinson | |
| 2014/0093836 | A1 | 4/2014 | Wolpo | |
| 2014/0166024 | A1 | 6/2014 | Davidson et al. | |
| 2014/0238416 | A1 | 8/2014 | Lin | |
| 2014/0238417 | A1 | 8/2014 | Turkbas | |
| 2014/0238418 | A1 | 8/2014 | Turkbas | |
| 2014/0261465 | A1 | 9/2014 | Turkbas | |
| 2014/0345626 | A1 | 11/2014 | Brett et al. | |
| 2014/0352704 | A1 | 12/2014 | Farrell | |
| 2015/0209645 | A1 | 7/2015 | Zents | |
| 2016/0001160 | A1 | 1/2016 | Engel | |
| 2017/0120135 | A1 | 5/2017 | Engel et al. | |
| 2017/0172717 | A1 | 6/2017 | Deng et al. | |
| 2017/0312613 | A1 | 11/2017 | Wright | |
| 2018/0014912 | A1 | 1/2018 | Radmand | |
| 2019/0209911 | A1 | 7/2019 | Turkbas | |

OTHER PUBLICATIONS

International Search Report and Written Opinion received for PCT Patent Application No. PCT/US14/018755, dated May 22, 2014, 6 pages.

International Search Report and Written Opinion received for PCT Patent Application No. PCT/US2014/018756, dated Jun. 3, 2014, 9 pages.

SuperFit Basketball Mouthguard, earliest comment Jul. 17, 2017, [online], [site visited Apr. 13, 2018]. Retrieved from url: https://www.shockdoctor.com/superfit-basketball-mouthguard-9200 (Year 2017).

U.S. Appl. No. 29/629,806 entitled Mouthguard, filed Dec. 15, 2017.

European Search Report issued in EP Application No. 14757382.6 dated Nov. 2, 2016, 9 pages.

Extended European Search Report issued in EP application No. 14756802.6, dated Oct. 31, 2016, 10 pages.

Gel Max Mouthguard, earliest comment Aug. 26, 2015, [online], [site visited Apr. 13, 2018]. Retrieved from url:https://www.shockdoctor.com/gel-max-mouthguard (Year: 2015).

Gel Max Power Mouthguard, earliest comment Oct. 9, 2017, [online], [site visited Apr. 13, 2018]. Retrieved from url:https://www.shockdoctor.com/gel-max-power-mouthguard (Year: 2017).

International Preliminary Report on Patentability issued in PCT/US2014/018755, dated Sep. 1, 2015, 5 pages.

International Preliminary Report on Patentability issued in PCT/US2014/018756, dated Sep. 11, 2015, 8 pages.

International Search Report and Written Opinion issued in PCT/US2014/018755, dated May 22, 2014, 8 pages.

International Search Report and Written Opinion issued in PCT/US2014/018756, dated Jun. 3, 2014, 11 pages.

International Search Report and Written Opinion issued in PCT/US2016/054693, dated Jul. 24, 2017, 17 pages.

PCT Invitation to Pay Additional Fees issued in PCT/US2016/054693, dated May 23, 2017, 14 pages.

Shock Doctor Gel Max Mouthguard, www.shockdoctor.com/gel-max-mouthguard, accessed Jan. 24, 2017, at least available on Apr. 10, 2016.

Shock Doctor Max AirFlow Football Mouthguard (2016 Version), www.shockdoctor.com/max-airflow-mouthguard-2016, accessed May 9, 2018, at least available in Apr. 2016.

Shock Doctor SuperFit Mouthguard, www.shockdoctor.com/superfit-mouthguard, accessed Jan. 24, 2017, at least available on Apr. 10, 2016.

Shock Doctor Ultra Double Braces Mouthguard, www.shockdoctor.com/ultra-double-braces-mouthguard, accessed Jan. 24, 2017, at least available on Apr. 10, 2016.

Shock Doctor Ultra2 STC Mouthguard, www.shockdoctor.com/ultra2-stc-mouthguard, accessed Jan. 24, 2017, at least available on Apr. 10, 2016.

U.S. Appl. No. 29/610,727 entitled Mouthguard, filed Jul. 14, 2017.

U.S. Appl. No. 29/610,733 entitled Mouthguard, filed Jul. 14, 2017.

U.S. Appl. No. 29/629,798 entitled Mouthguard, filed Dec. 15, 2017.

U.S. Appl. No. 29/629,806 entitled Moutguard, filed Dec. 15, 2017.

* cited by examiner

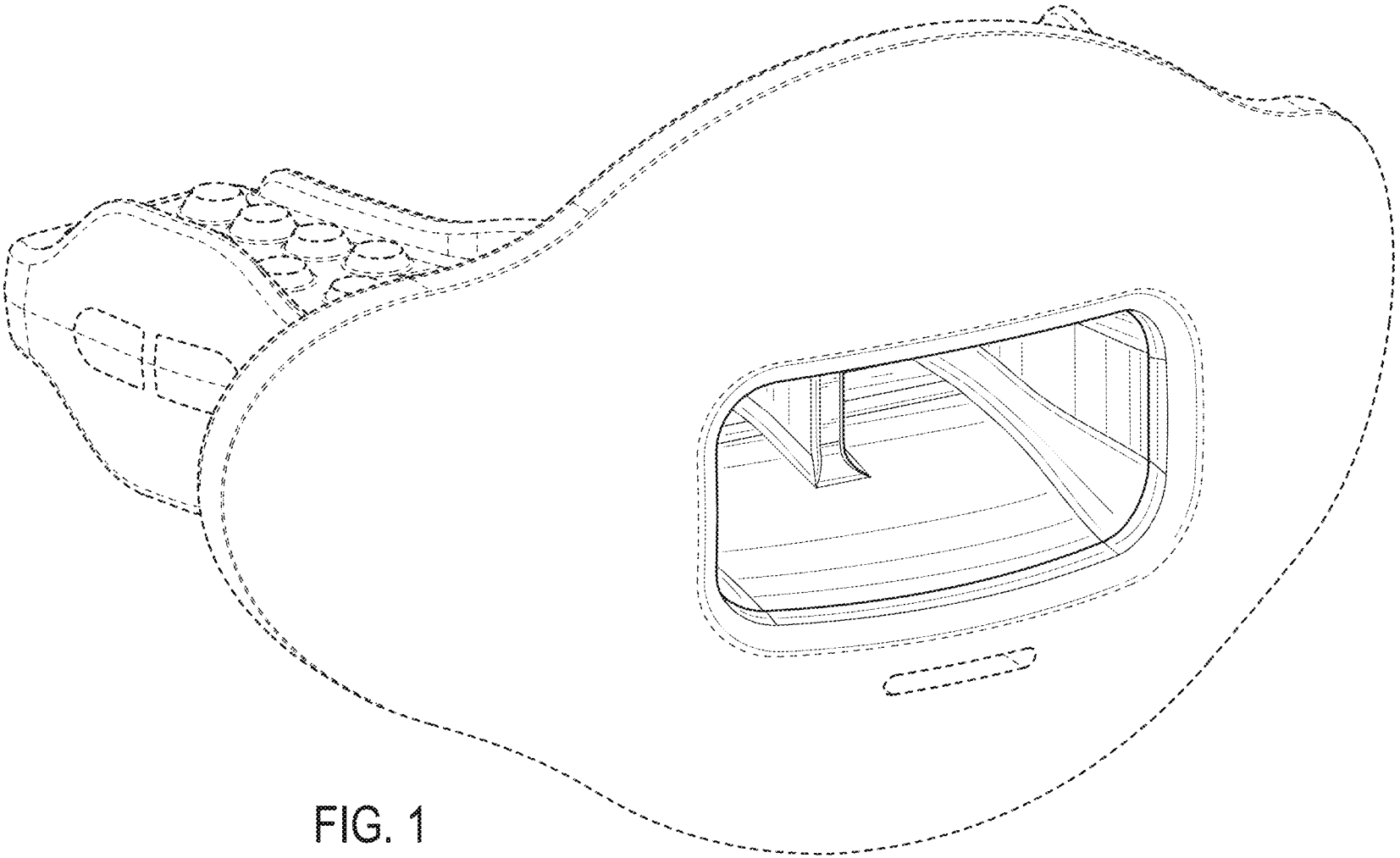
FIG. 1
AMENDED

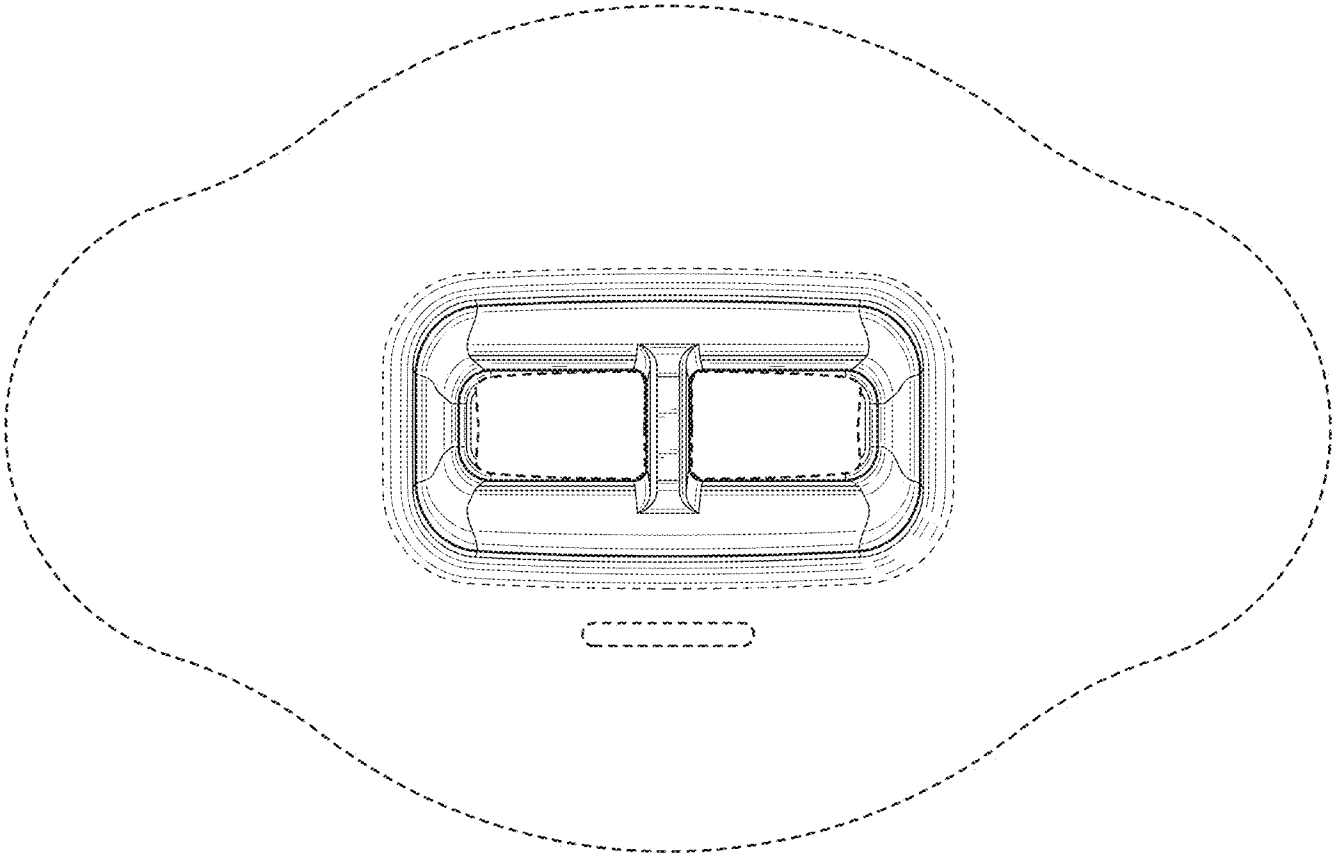
FIG. 2
AMENDED

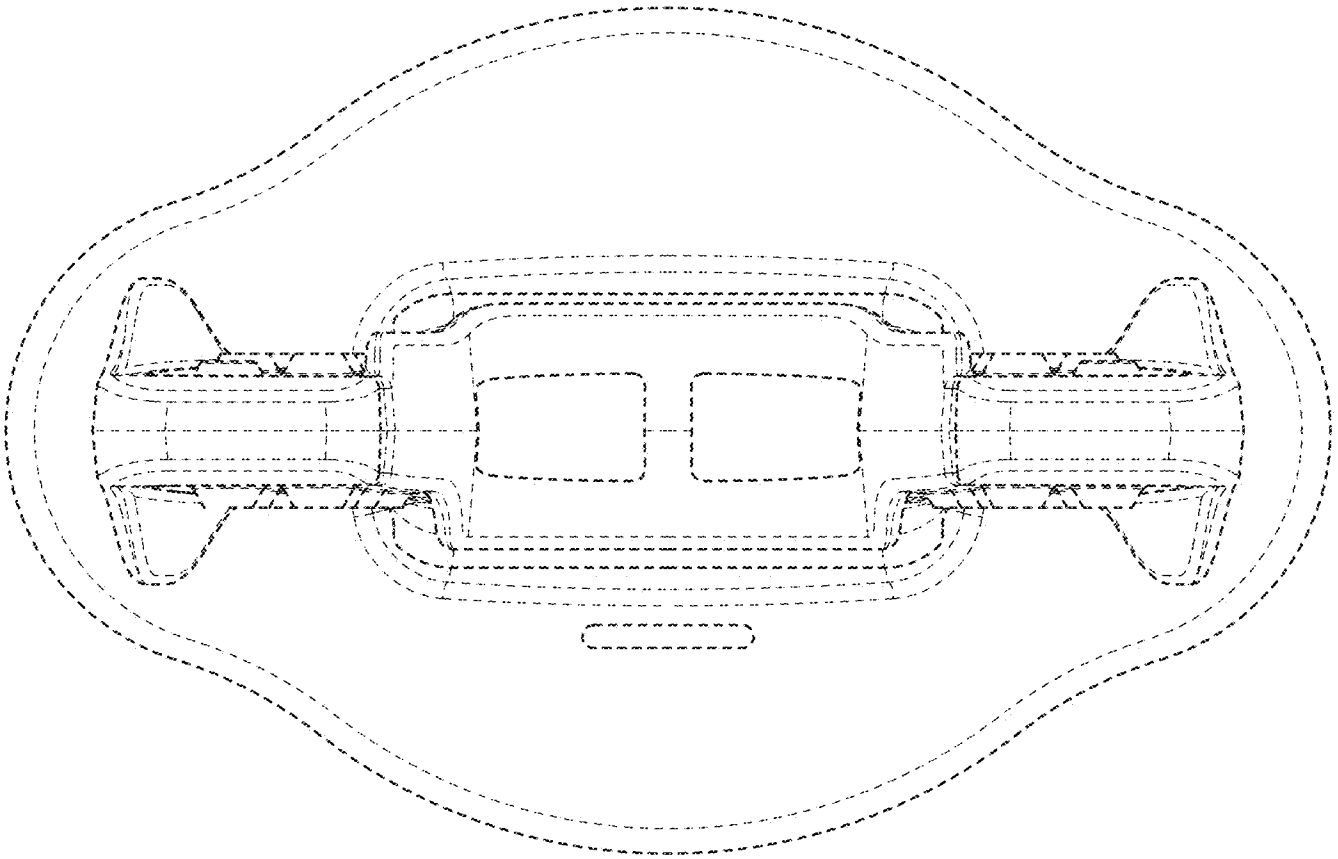
FIG. 3
AMENDED

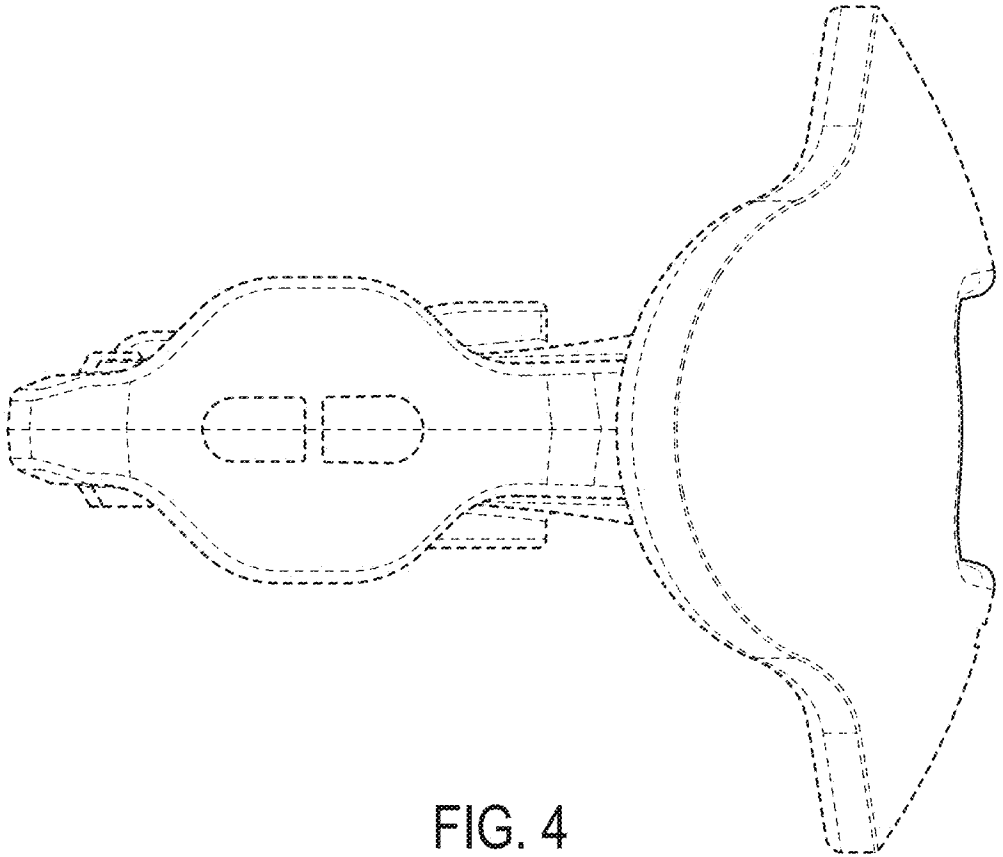
FIG. 4
AMENDED

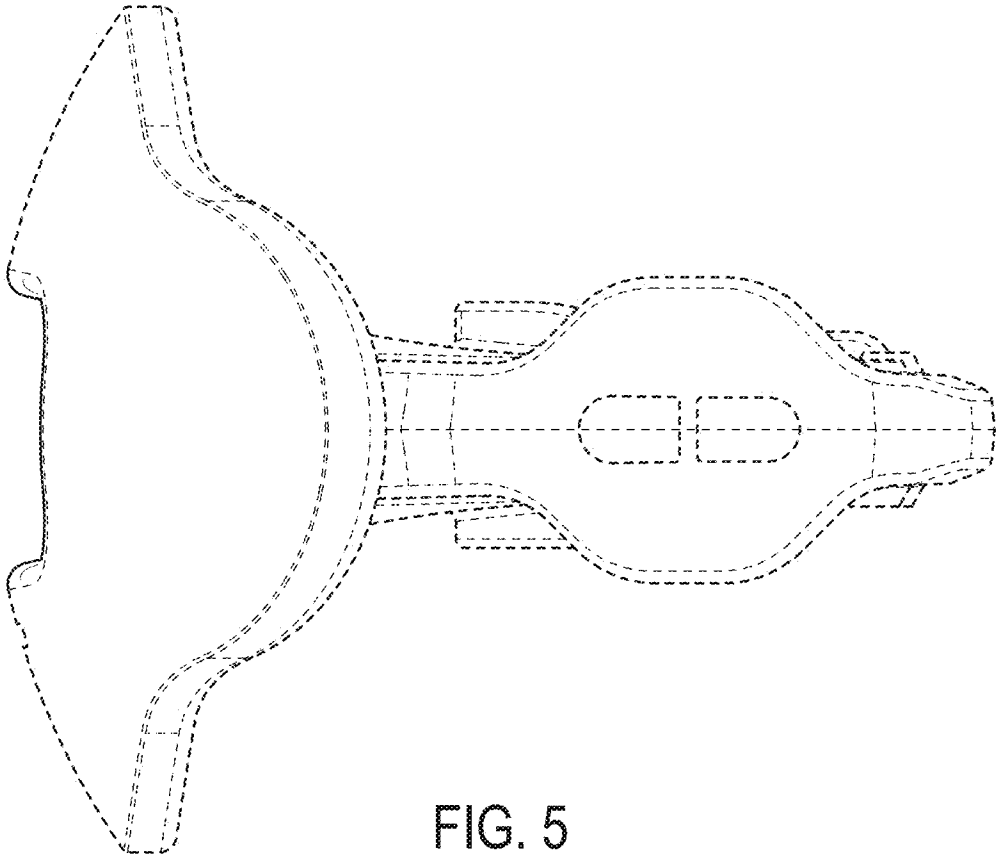
FIG. 5
AMENDED

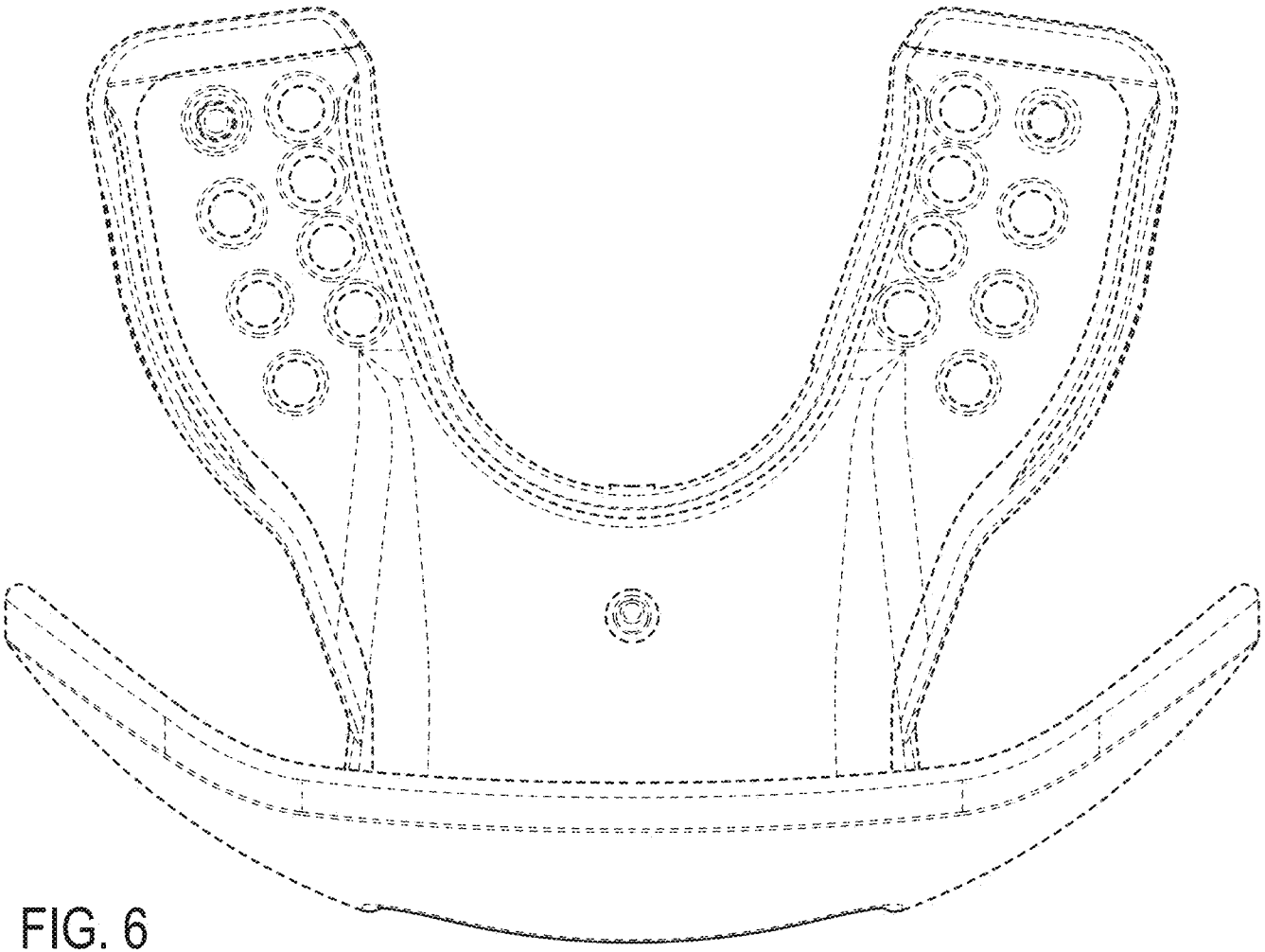
FIG. 6
AMENDED

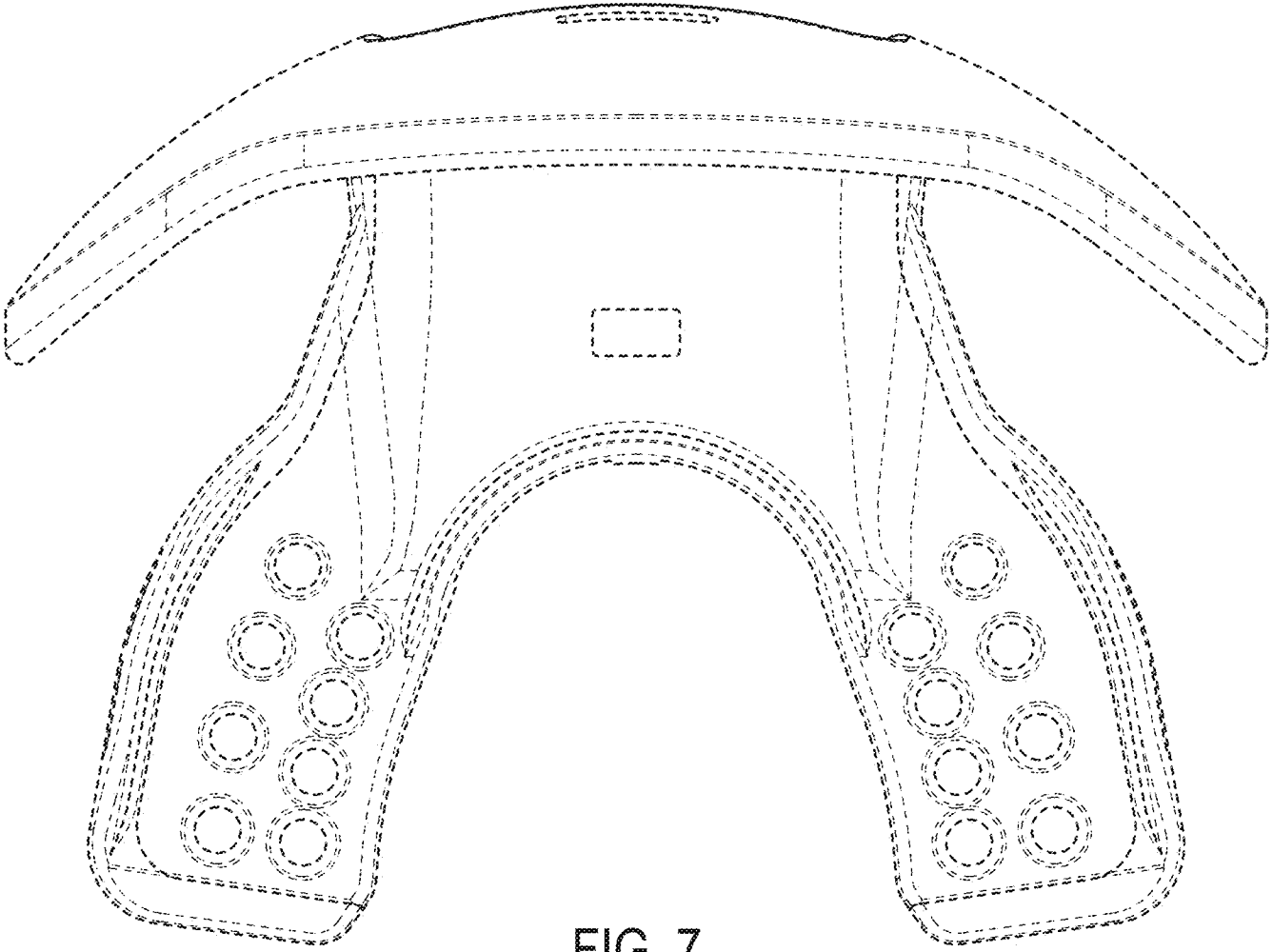
FIG. 7
AMENDED

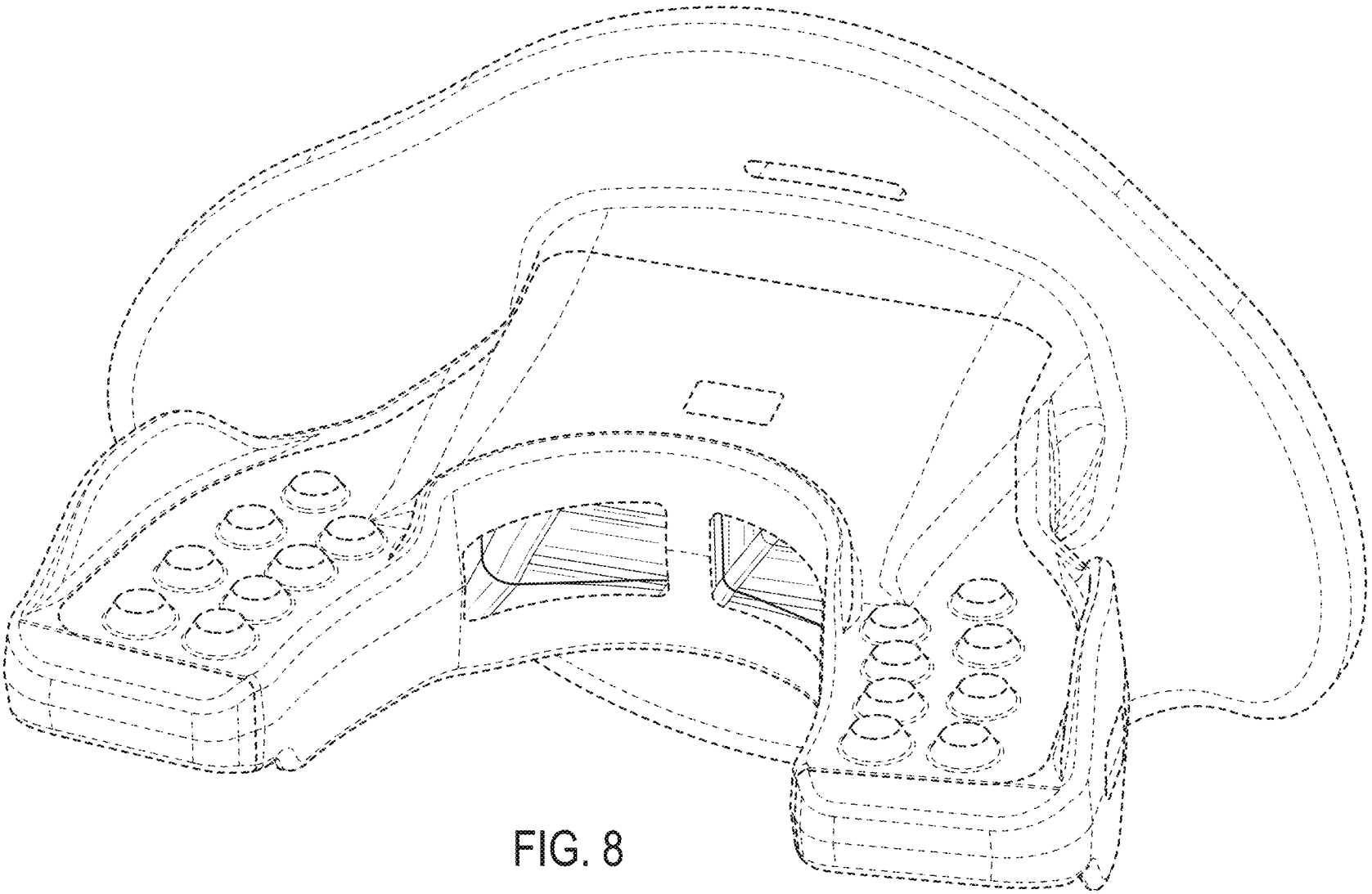
FIG. 8
AMENDED